United States Patent Office 3,629,170
Patented Dec. 21, 1971

3,629,170
THERMOPLASTIC RESIN COMPOSITION AND A METHOD FOR THE PRODUCTION THEREOF
Saburo Yamanouchi, Kobe, Kiyoshi Yasuno, Ibaragi-shi, and Shuji Kitamura, Toyonaka-shi, Japan, assignors to Sumitomo Chemical Company, Ltd., Osaka, Japan
No Drawing. Filed May 5, 1969, Ser. No. 821,942
Claims priority, application Japan, Nov. 30, 1968, 43/87,956
Int. Cl. C08f 29/22
U.S. Cl. 260—23 XA                    10 Claims

ABSTRACT OF THE DISCLOSURE

The thermoplastic resin composition of the present invention is a mixture of 99 to 10 parts by weight of a polyvinyl chloride resin and 1 to 90 parts by weight of an aromatic polysulfonic resin having superior heat resistance together with an improved impact strength, and is suitable for use as articles for chemical industries, construction materials, etc.

This thermoplastic resin composition is most advantageously produced by mixing polyvinyl chloride and aromatic polysulfone containing a stabilizing agent for polyvinyl chloride, such as dibutyl tin dilaurate, dibutyl tin maleate, tin mercaptide, lead oxide, tribasic lead sulfate, dibasic lead phosphite, dibasic lead stearate, cadmium stearate, barium stearate, alkaline earth silicates, hydroquinone or epoxide and a stabilizing agent for aromatic polysulfone, such as naphthalene thiol, benzimidazole, organic sulfides, imides, phosphates or organo tin compounds, adding a low molecular weight compound such as an aromatic hydrocarbon, a chlorinated hydrocarbon, a ketone, an ester or an ether to the mixture and thereafter removing the low molecular weight compound.

---

The present invention relates to a thermoplastic resin composition consisting of a uniform mixture of a polyvinyl chloride resin and an aromatic polysulfonic resin, a method for producing the same and a great improvement of an impact strength and heat-resistance of polyvinyl chloride.

A hard polyvinyl chloride resin has very good properties of resistance to weathering and chemicals, good tensile strength and is self-extinguishing, and therefore, is broadly used as supplies for chemical industries, construction materials etc.

However, the hard polyvinyl chloride resin has a poor impact strength and heat resistance, and therefore, the range of their use is limited in spite of the good other properties.

In order to improved the above defects, heretofore, many means have been proposed.

For example, for a typical method for improving impact strength, there are methods wherein an acrylonitrile-butadiene copolymer or an acrylonitrile-butadiene-styrene terpolymer is incorporated into polyvinyl chloride resins, but in the former case the heat resistance and tensile strength are extremely decreased while in the later case resistance to chemicals and weathering is remarkably decreased, although improvement of the impact strength is obtained by the incorporations above.

On the other hand, for a method for improving the heat-resistance of polyvinyl chloride, there has been proposed a method of after-chlorinating polyvinyl chloride, a method of incorporating after-chlorinated polyvinyl chloride into the polyvinyl chloride and a method of cross-linking the molecules, but these methods are found to cause the reduction of the impact strength of polyvinyl chloride.

Generally, a method for greatly improving the heat resistance as well as the impact strength of the resins has not been known. Even if an improvement of the two is observed, one of them is slightly improved. In other words, only one of the properties is improved without substantial degradation of the other property.

The present inventors have made studies for the purpose of improvement of the impact strength and the heat resistance of polyvinyl chloride resins and found a composition which is greatly and simultaneously improved in impact strength and heat resistance.

The present invention improved not only the impact strength by mixing uniformly a polyvinyl chloride resin and an aromatic polysulfonic resin as described hereinafter but also greatly improves the heat resistance, and further provides a compositon having a superior resistance to chemicals and which is self-extinguishing.

The polyvinyl chloride resins used in the present invention include a homopolymer of polyvinyl chloride, and a random, a block and a graft copolymer of at least 75% by weight of polyvinyl chloride and one or more ethylenically unsaturated compounds. The ethylenically unsaturated compounds described herein are, for example, vinyl acetate, vinyl propionate, vinyl butyrate, vinyl laurate, ethyl acrylate, methyl methacrylate, allyl acetate, allyl chloride, allyl ethyl ether, vinylidene chloride, ethylene, propylene, etc. An ethylene-vinyl acetate copolymer-vinyl chloride graft copolymer obtained by grafting vinyl chloride on an ethylene-vinyl acetate copolymer, is an example of the graft copolymer of vinyl chloride and ethylenically unsaturated compounds.

The polymerization degree of polyvinyl chloride suitable for use in the present invention ranges preferably from 400 to 4000. The polymerization degree is determined according to JIS K–6721.

The aromatic polysulfonic resins used in the present invention are characterized by containing benzene rings and sulfone groups in the high molecular main chain thereof and, for example, have the following formulae (a)–(o), wherein $n$ indicates the degree of polymerization. The aromatic polysulfonic resin having formulae (a) and (f) are preferably employed.

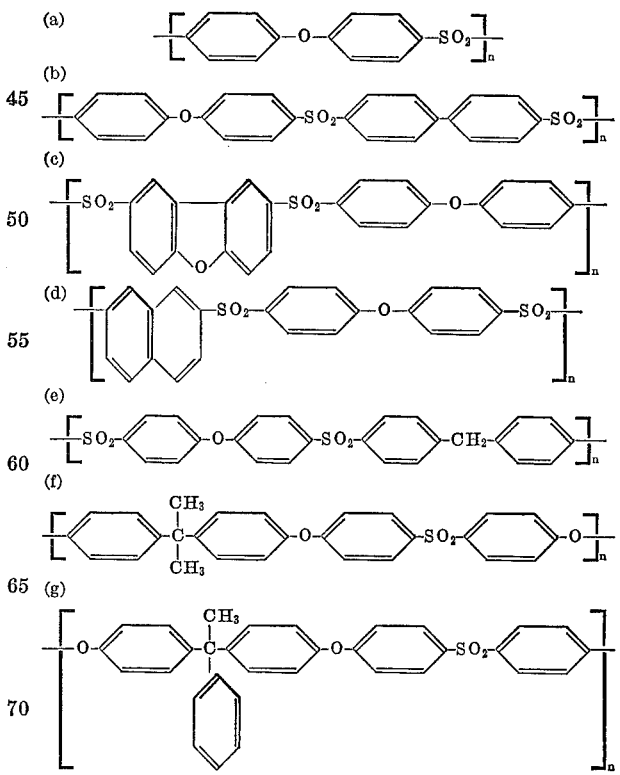

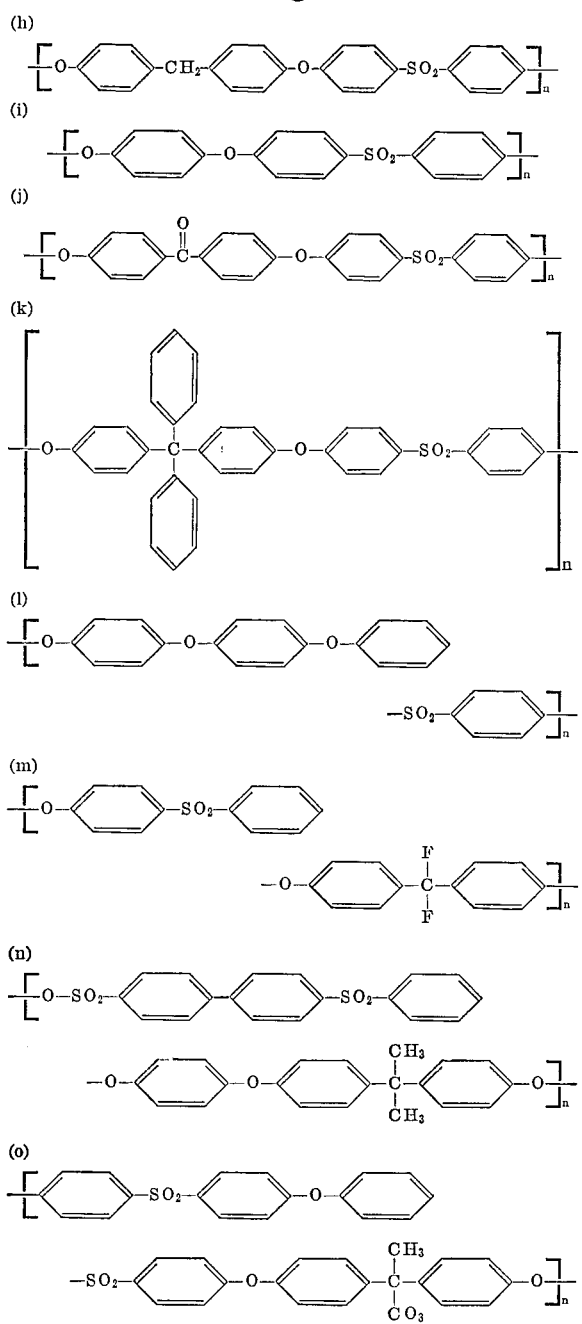

The ratios of said components suitable for obtaining thermoplastic resin compositions having high resistance to impact and high heat resistance as required by the present invention are 99 to 10 parts by weight of polyvinyl chloride resins to 1 to 90 parts by weight of aromatic polysulfonic resins.

Less than 1 part by weight of the aromatic polysulfonic resin does not provide compositions having superior resistance to impact and heat resistance and, on the other hand, more than 90 parts by weight thereof lowers the processability of the composition.

A melting and mixing method for obtaining said composition may be any of the kneading methods by a roller, Banbury's mixer or extruder, which are conventionally used for such purposes. For example, after pre-kneading the aromatic polysulfonic resin alone containing a stabilizing agent as described hereinafter at a temperature of 240° to 250° C. by using a two-roll mill to often the resin, the polyvinyl chloride resin containing a stabilizing agent as described hereinafter is portionwise added and mixed with said softened resin. However, the melting point of the aromatic polysulfonic resin is more than 250° C. and 80° C. higher than that of polyvinyl chloride resins. The kneading requires a temperature more than the melting point of aromatic polysulfonic resin, but such a high temperature is not desirable since the decomposition point of polyvinyl chloride resin is approximately 200° C. and the kneading at such a high temperature results in violent thermal decomposition of polyvinyl chloride.

We have studied a method for producing said composition by a melting and mixing process without the colouring of polyvinyl chloride through decomposition and found that a composition of high quality can be produced without the colouring of polyvinyl chloride through decomposition by a method wherein aromatic polysulfone and polyvinyl chloride impregnated with low molecular weight compounds are melt-mixed to obtain a uniform mixture and then the low molecular weight compounds are removed.

For the impregnating low molecular weight compounds used in the production according to the present invention, the compounds may be any of the low molecular weight compounds capable of swelling the aromatic polysulfone and being removed by any method after the mixing with polyvinyl chloride. For example, aromatic hydrocarbons, chlorinted hydrocarbons, ketones, ethers, ester, etc., are included.

For the purpose of removing and recovering of the impregnating compounds, ethylene dichloride, trichloride, carbon tetrachloride, chloroform, methylene chloride, benzene, methyl ethyl ketone, tetrahydrofuran and ethyl acetate are preferred favorable.

For a method for impregnating the aromatic polysulfonic resin with the low molecular weight compound, there are various methods other than the method disclosed in the examples, and good compositions can be obtained by any of the methods. For example, there may be used the method which comprises mixing previously an aromatic polysulfonic resin powder and a polyvinyl chloride powder at room temperature in a mixer and then impregnating the mixture with the low molecular weight compound by dropping.

A vent type extruder is suitable for recovering the low molecular weight compounds.

In another mixing method, polyvinyl chloride resins and aromatic polysulfonic resin may be dissolved and mixed together in a common solvent for the two and then co-precipitated in a non-solvent for the two. For example, any ratio of polyvinyl chloride and aromatic polysulfonic resin is dissolved in tetrahydrofuran and the solution is fully agitated, and thereafter this solution in tetrahydrofuran is poured into a great amount of methanol, whereby both the resins are co-precipitated. The resulting co-precipitates are washed with methanol and dried.

Furthermore, the use of this type of mixing method in a process for manufacturing aromatic polysulfonic resins is very advantageous in industry.

That is, for the process for manufacturing aromatic polysulfonic resin, as shown in Japanese Patent Publications Nos. 12919/66 and 7799/67, aromatic polysulfonic resins can conventionally be obtained by the polymerization reaction in an inert organic solvent having high polarity, putting the resulting polymer solution into methanol or water, filtering the solution and drying the obtained residue.

According to Japanese Patent Publication 7799/67 there is disclosed a process for the preparation of a linear polyarylene polyether comprising a recurring unit having the formula,

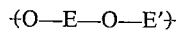

wherein E stands for a dihydric phenol residue; E' stands for a benzenoid compound residue having an inert electron-withdrawing group in at least one position para or ortho to a valence bond, said both residues being valence-bonded to an etheric oxygen through an aromatic carbon atom, which comprises reacting an alkali metal disalt of a dihydric phenol with a dihalobenzenoid compound having an electron-withdrawing group in at least one position para or ortho to a halogen atom in the liquid phase of an inert, highly polar, organic solvent under anhydrous conditions. A preferred inert electron-withdrawing group is the sulfone group.

According to Japanese Patent publication 12191/66, there is disclosed a process for producing substantially linear polyarylsulfones, which comprises mixing a compound having the general formula $R(SO_2X)_y$ and a compound having the general formula $R'(SO_2X)_w$, wherein R is $y$-valent aryl containing at least 2 aromatic rings or $y$-valent fused nucleus, R' is $w$-valent aryl containing at least 2 aromatic rings or $w$-valent fused nucleus, $y$ is an integer of 1–2, $w$ is a digit of 0–1, and when $y$ is 2, $w$ is 0 and when $y$ is 1, $w$ is 1 and X is bromine or chlorine, and an inert solvent, adding a catalytic amount of a Lewis acid before or after heating the mixture, and then heating the mixture at a temperature within the range of about 100° C.–250° C. to effect polymerization.

For said inert organic solvents, aliphatic and aromatic sulfones such as dimethylsulfoxide, dimethylsulfone and p,p-dichlorodiphenylsulfone, or aliphatic and aromatic chlorides such as methylene chloride, tetrachloroethane, monochlorobenzene and dichlorobenzene, or aliphatic and aromatic nitro-compounds such as nitropropane and nitrobenzene may be used. Since these solvents are effective even for the polyvinyl chloride, the uniformly mixed composition of the present invention can be obtained by introducing into the aromatic polysulfonic resin solution a solution of a polyvinyl chloride resin in the same solvent or tetrahydrofuran at the completion of polymerization in the course of the production of the aromatic polysulfonic resins, fully agitating the mixed solution, then pouring the solution into methanol or water, filtering the resulting solution, washing and drying the obtained residue.

However, the dissolving and mixing method requires a great amount of the common solvent for polyvinyl chloride and polysulfonic resins and of precipitating agents and, therefore, the melting and mixing method is industrially more advantageous.

To the composition of the present invention may be added a conventional stabilizing agent for polyvinyl chloride resins, such as dibutyl tin dilaurate, dibutyl tin maleate, tin mercaptide, lead oxide, tribasic lead sulfate, dibasic lead phosphite, dibasic lead stearate, cadmium stearate, barium stearate, alkaline earth silicates, hydroquinone or epoxides or a stabilizing agent for the aromatic polysulfonic resins, such as naphthalene thiol, benzimidazole, organic sulfides, imides, phosphates, and organo tin compounds. And further lubricants, pigments and fillers also may be contained in the composition.

It is one of the characteristics of the present invention that the uniformly mixed composition can be formed at a temperature near the forming temperature of polyvinyl chloride alone. It is possible to use the extrusion forming method, injection molding method and calendering method, and thereby to obtain articles having a high resistance to impact and heat resistance, for example, pipes, corrugated plates, wainscot and various construction materials.

The following examples will illustrate the present invention, but these examples can be properly modified within the scope of the present invention.

EXAMPLE 1

500 g. of tribasic lead sulfate, 50 g. of lead stearate and 50 g. of calcium stearate were added as stabilizing agents to 6 kg. of polyvinyl chloride resin (manufactured by Sumitomo Kagaku K.K.; trademark of Sumirit SX-11) and 3 kg. of aromatic polysulfonic resin (manufactured by Union Carbide Corporation; trade name: Bakelite Polysulfone PX1700), and mixture was dry-blended in Henschel mixer maintained at about 130° C. The Henschel mixer was then cooled to room temperature and 1 kg. of polyvinyl chloride impregnated with 4.5 kg. of ethylene dichloride was added to the above mixture. This mixture was extruded at the maximum resin temperature of 190° C. by a 30 mm.-diameter extruder (made by Tanabe Plastic Kikai), and thus, a foamed composition was obtained. The ethylene dichloride was then removed at 100° C. by a vacuum dryer and a composition of high quality was obtained without the decomposing and coloring of polyvinyl chloride.

EXAMPLE 2

The melt-mixing was carried out in the same manner as in Example 1 by using a two-axes vent type extruder (made by Ikegai Tekko K.K., RC–100).

By operating the two-axes vent type extruder under the following conditions, pellet-shaped compositions of high quality were obtained without the decomposing and coloring of polyvinyl chloride.

The operating conditions are as follows:

(1) The maximum resin temperature: 190° C.
(2) A pressure to resin: 70 kg./cm.$^2$
(3) A degree of vacuum in vent: 60 mm. Hg A conventional trap for vacuum testing was provided with a vent, and the trap was cooled to −78° C., whereby the ethylene dichloride was recovered.

EXAMPLE 3

100 g. of the mixture of polyvinyl chloride having an average degree of polymerization of 1100 (manufactured by Sumitomo Kagaku K.K. and sold in the trademark of Sumirit SX–11) and aromatic polysulfone (manufactured by Union Carbide Corporation and sold in the trademark of Bakelite Polysulfone P–1700) having the following formula

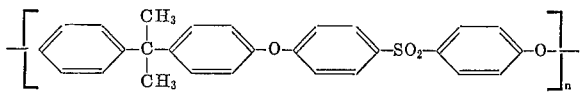

wherein $n$ indicates the degree of polymerization and an apparent viscosity of $2.2 \times 10^4$ poise when being flown out from a 1 mm.-diameter and 10 mm.-length nozzle at 300° C. under a pressure of 1 kg./cm.$^2$, in a proportion as shown in Table 1, was dissolved in 1 litre of tetrahydrofuran while being agitated, and thereafter, the resulting solution was poured into a great amount of methanol and the uniform mixture was precipitated. This uniform mixture was filtered and vacuum-dried at 100° C.

To the obtained composition was added and blended a stabilizing agent for polyvinyl chloride resins by a mixing roll maintaining at 170° C. and, thereafter, the pressure molding was carried out at 180° C., and a Vicat's softening point, and tensile impact strength of the mold were determined.

The Vicat's softening point was indicated by a temperature at which a needle attained a depth of 1 mm. at a heating rate of 0.8° C./min. under a load of 2 kg. The used sample was 3 mm. thick and the used testing machine was in accordance with ASTM D 1525. The tensile impact strength were determined at 20° C. under a drawing rate of 330 cm./sec. by the tensile strength-testing machine made by Yasuda Seiki.

These results are shown in Table 1. The stabilizing agent recipes of tin shown in Table 1 mean that 5% by weight of mercapto tin based on the weight of resin composition is contained, and the stabilizing agent recipes of lead mean that 3% by weight of tribasic lead sulfate and 0.5% by weight of lead stearate based on the weight of resin composition are contained.

TABLE 1

| No. | Resin composition (parts by weight) | | Vicat's softening point (° C.) | Tensile impact strength (kg.-cm./cm.²) | Stabilizing agent recipe |
|---|---|---|---|---|---|
| | Polyvinyl chloride | Aromatic polysulfone | | | |
| I | 90 | 10 | 87 | 120 | Tin. |
| II | 70 | 30 | 103 | 100 | Tin. |
| II' | 70 | 30 | 113.4 | 120 | Lead. |
| III | 50 | 50 | 119 | 120 | Tin. |
| IV | 30 | 70 | 128 | 100 | Tin. |
| Control | 100 | 0 | 75.5 | 50 | Tin. |

As is clear from Table 1, the resin composition of the present invention has both higher heat-resistance and higher impact strength than those of polyvinyl chloride alone.

EXAMPLE 4

With respect to Resin Composition II' in the Table 1 of Example 3, a thermal stability at an elevated temperature was determined by a gear type aging-testing machine maintained at 190° C. Resin Composition II' became merely brown after 180 minutes, but polyvinyl chloride alone with the same stabilizing agent recipe became black after 120 minutes owing to the violent decomposition.

EXAMPLE 5

30 parts by weight of the same aromatic polysulfone as in Example 3 were softened by a mixing roll maintained at a temperature of 240° to 250° C. on the surface thereof, and then 70 parts by weight of polyvinyl chloride containing 5 parts by weight of a mercapto tin stabilizing agent and having an average degree of polymerization of 1100 were added and blended portionwise to the softened aromatic polysulfone. The mixture was homogenized during 5 minutes.

The mixture was pressure-molded. A Vicat's softening point, and Charpy impact strength according to ASTM-256 were determined. The impact strength was 3.1 kg.-cm./cm.² at 20° C., with a testing piece equipped with a notch, and the Vicat's softening point thereof was 104° C.

The impact strength of polyvinyl chloride alone with the same stabilizing agent recipe was only 2.2 kg.-cm./cm.², and the Vicat's softening point thereof was only 75° C.

Further, the burning test according to ASTM–635–63 was carried out. The burning of the composition stopped after two seconds since flame of a Bunsen burner had been removed.

EXAMPLE 6

According to Japanese Patent Publication 7799/67, a dialkali-salt of 2,2-bis(4-hydroxyphenyl) propane was synthesized from 2,2-bis(4-hydroxyphenyl) propane and sodium hydroxide by using anhydrous dimethylsulfoxide as a solvent. The dialkali-salt of 2,2-bis(4-hydroxyphenyl) propane was condensation-polymerized with bis(4-chlorophenyl) sulfone at 130° to 140° C for 5 hours in a nitrogen atmosphere. Finally obtained aromatic polysulfone solution in dimethylsulfoxide was a viscous liquid containing 1.1 kg. of aromatic polysulfone in 45 l. of dimethylsulfoxide. A reduced viscosity of the obtained aromatic polysulfone which was determined at 25° C. in chloroform, was 0.68.

50 l. of monochlorobenzene were added and diluted to the aromatic polysulfone solution of dimethylsulfoxide, while 20 kg. of polyvinyl chloride having the average degree of polymerization of 1100 were dissolved in 400 l. of tetrahydrofuran and the resulting solution was mixed with said aromatic polysulfone solution and to the mixture was added methanol to cause the co-precipitation. The co-precipitate was washed with methanol and, thereafter, vacuum-dried at 110° C. to obtain a uniform resin composition.

3 parts of tribasic lead sulfate, 2 parts of lead stearate and 1 part of VLTN–4 (manufactured by Kawakami Institute, a lubricant containing octadecyl stearate as a main component) to 100 parts of said obtained composition was mixed by Henschel mixer, and the obtained mixture was extruded from an extruder provided with a 30 mm.-diameter screw, L/D of 20 and a compression rate of 3.5 while maintaining a temperature of the die at 200° C. to form a rod of 3 mm. in diameter. The rod was pressure-formed at 190° C. into a sheet. The Vicat's softening point and the tensile impact strength of this sheet were 110° C. and 105 kg.-cm./cm.², respectively.

EXAMPLE 7

According to the method described in Japanese Patent Publication 37876/64, 150 parts of ethylene-vinyl acetate copolymer (manufactured by Bayer and sold in the trademark of Levaplene 450), 3300 parts of water, 3 parts of α,α'-azodiisobutyronitrile, 5 parts of polyvinyl alcohol and 1350 parts of vinyl chloride were placed in an autoclave, and the mixture was agitated strongly at room temperature for 5 hours, and thereafter subjected to the polymerization reaction at 60° C. for 15 hours. Ethylene-vinyl acetate copolymer-vinyl chloride graft copolymer was obtained.

80 parts by weight of said graft copolymer and 20 parts by weight of aromatic polysulfone (manufactured by Union Carbide Corporation and sold in the trademark of Bakelite Polysulfone P-1700) were dissolved in tetrahydrofuran as in Example 1. They were coprecipitated by a great amount of methanol to form a composition. After the composition was dried, 5% by weight of a stabilizing agent of mercapto tin based on the composition was added thereto, then blended by a mixing roll maintained at 170° C., and pressure-formed at 180° C. The Vicat's softening point and the tensile impact strength of the composition were 93° C. and 180 kg.-cm./cm.², respectively. On the other hand, the Vicat's softening point and the tensile impact strength of ethylene-vinyl acetate copolymer-vinyl chloride copolymer used in this example were 73° C. and 165 kg.-cm./cm.², respectively. Thus, an improvement of heat resistance and impact strength could be simultaneously achieved by blending polyvinyl chloride and aromatic polysulfone.

What we claim is:

1. A thermoplastic resin composition which comprises a uniform mixture of 99 to 10 parts by weight of a vinyl chloride resin and 1 to 90 parts by weight of an aromatic polysulfonic resin comprising the unit

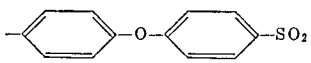

2. A thermoplastic resin composition according to claim 1, wherein said vinyl chloride resin is a homopolymer of vinyl chloride.

3. A thermoplastic resin composition according to claim 1, wherein said vinyl chloride resin is a random or graft copolymer of at least 75% by weight of vinyl chloride and one or more other ethylenically unsaturated compounds.

4. A thermoplastic resin composition according to claim 3, wherein the other ethylenically unsaturated compounds are vinyl acetate, vinyl propionate, vinyl butyrate, vinyl laurate, ethyl acrylate, methyl methacrylate, allyl acetate, allyl chloride, allyl ethyl ether, vinylidene chloride, ethylene and propylene.

5. A thermoplastic resin composition according to claim 3, wherein said graft copolymer is a graft copolymer of vinyl chloride on ethylene-vinyl acetate copolymer.

6. A thermoplastic resin composition according to claim 1, wherein the degree of polymerization of vinyl chloride resin is 400 to 4000.

7. A thermoplastic resin composition according to claim 1, which further contains a thermal stabilizing agent for vinyl chloride resin and a thermal stabilizing agent for aromatic polysulfonic resin.

8. A thermoplastic resin composition according to claim 7, wherein stabilizing agent for vinyl chloride resin is dibutyltin dilaurate, dibutyltin maleate, tin mercaptide, lead oxide, tribasic lead sulfate, dibasic lead phosphite, dibasic lead stearate, cadmium stearate, barium stearate, alkaline earth silicate, hydroquinone or an epoxide and the stabilizing agent for aromatic polysulfonic resin is naphthalene thiol, benzimidazol, an organic sulfide, an imide, a phosphate or an organo tin compound.

9. A thermoplastic resin composition according to claim 1, wherein a lubricant, a pigment and a filler are further contained.

10. An article molded by using a thermoplastic resin composition according to claim 1.

References Cited

UNITED STATES PATENTS

| | | | |
|---|---|---|---|
| 2,611,153 | 9/1952 | Semegen | 260—899 X |
| 2,658,052 | 11/1953 | Signer et al. | 260—899 X |

DONALD E. CZAJA, Primary Examiner

D. J. BARRACK, Assistant Examiner

U.S. Cl. X.R.

260—34.2, 41 R, 45.7 P, 45.7 S, 45,75 R, 45.7 SK, 45.8 A, 45.8 N, 45.85, 45.9 R, 79.3 A, 823, 897 C, 899

UNITED STATES PATENT OFFICE
CERTIFICATE OF CORRECTION

Patent No. 3,629,170    Dated December 21, 1971

Inventor(s) Saburo Yamanouchi et al.

It is certified that error appears in the above-identified patent and that said Letters Patent are hereby corrected as shown below:

Please insert the missing claim for priority:

--Japanese No. 43/31468 of May 10, 1968 --

Signed and sealed this 8th day of August 1972.

(SEAL)
Attest:

EDWARD M. FLETCHER, JR.　　　ROBERT GOTTSCHALK
Attesting Officer　　　　　　Commissioner of Patents